United States Patent
Jia et al.

(10) Patent No.: US 11,015,062 B2
(45) Date of Patent: May 25, 2021

(54) GRANULAR CONDUCTIVE CARBON BLACK AND PREPARATION METHOD THEREOF

(71) Applicant: JIAOZUO CITY HEXING CHEMICAL INDUSTRY CO., LTD., Henan (CN)

(72) Inventors: Shuili Jia, Henan (CN); Julan Jiao, Henan (CN); Ningning Yang, Henan (CN)

(73) Assignee: JIAOZUO CITY HEXING CHEMICAL INDUSTRY CO., LTD., Henan (CN)

(*) Notice: Subject to any disclaimer, the term of this patent is extended or adjusted under 35 U.S.C. 154(b) by 0 days.

(21) Appl. No.: 16/917,835

(22) Filed: Jun. 30, 2020

(65) Prior Publication Data

US 2021/0054214 A1 Feb. 25, 2021

(30) Foreign Application Priority Data

Aug. 20, 2019 (CN) .......................... 201910771382.0

(51) Int. Cl.
  *C09C 1/58* (2006.01)
(52) U.S. Cl.
  CPC ............ *C09C 1/58* (2013.01); *C01P 2004/52* (2013.01); *C01P 2004/61* (2013.01); *C01P 2006/40* (2013.01)
(58) Field of Classification Search
  CPC ...................................................... C09C 1/58
  See application file for complete search history.

(56) References Cited

U.S. PATENT DOCUMENTS 4,366,139 A 12/1982 Kuhner et al.
8,394,190 B2 * 3/2013 Bertzick .................. C09C 1/58
  106/472

FOREIGN PATENT DOCUMENTS

CN 103834198 A 6/2014
CN 108587251 A 9/2018

OTHER PUBLICATIONS

Office Action 1 of Priority Document CN201910771382.0 dated Jan. 16, 2020.
Notification to Grant Patent Right for Invention CN201910771382.0.
First Search Report for CN201910771382.0.

* cited by examiner

*Primary Examiner* — Stuart L Hendrickson
(74) *Attorney, Agent, or Firm* — Barnes & Thornburg LLP

(57) ABSTRACT

A granular conductive carbon black and a preparation method thereof, belonging to the technical field of conductive carbon blacks. The method for preparing a granular conductive carbon black includes making a raw material of the conductive carbon black undergo moistening with water of a temperature of 80° C. or higher, performing wet granulation and drying in sequence. The raw material of the conductive carbon black is infiltrated by the water of a temperature of 80° C. or higher, so that the hydrophilic property of the raw material of the conductive carbon black is enhanced, the water of a temperature of 80° C. or higher enters the microporous structures of the raw material of the conductive carbon black, then a good moistening effect is achieved, and further the granular conductive acetylene carbon black with uniform particle size distribution is prepared through wet granulation and drying.

6 Claims, No Drawings

GRANULAR CONDUCTIVE CARBON BLACK AND PREPARATION METHOD THEREOF

CROSS-REFERENCE TO RELATED APPLICATION

This application claims priority to Chinese Patent Application No. 2019107713820, filed with the Chinese Patent Office on Aug. 20, 2019, entitled "Granular Conductive Carbon Black and Preparation Method thereof", which is incorporated herein by reference in its entirety.

TECHNICAL FIELD

The present disclosure relates to the technical field of conductive carbon blacks, in particular to a granular conductive carbon black and a preparation method thereof.

BACKGROUND ART

The conductive carbon black, insoluble in water, is only moistened with deionized water and stirred during granulation, but is not easy to be stirred uniformly, then resulting in a relatively large range of particles after granulation, ranging 0.2-0.6 mm. If a dispersant is added for improvement, impurities will be indirectly introduced such that purity of the granular acetylene black is reduced, which does not meet requirements of some products.

SUMMARY

In a first aspect, an example of the present disclosure provides a method for preparing a granular conductive carbon black, wherein the method for preparing a granular conductive carbon black comprises:

making a raw material of the conductive carbon black undergo, in sequence, moistening with deionized water of a temperature of 80° C. or higher; performing wet granulation and drying, wherein the wet granulation comprises uniformly mixing the deionized water with the raw material of the conductive carbon black having been moistened by the deionized water of a temperature of 80° C. or higher.

In a second aspect, an example of the present disclosure provides a granular conductive carbon black, wherein the granular conductive carbon black is prepared according to the above method for preparing a granular conductive carbon black.

DETAILED DESCRIPTION OF EMBODIMENTS

Embodiments of the present disclosure will be described in detail below in combination with examples, while a person skilled in the art would understand that the following examples are merely used for illustrating the present disclosure, but should not be considered as limitation on the scope of the present disclosure. If no specific conditions are specified in the examples, they are carried out under conventional conditions or conditions recommended by manufacturers. If manufacturers of reagents or apparatuses used are not specified, they are conventional products commercially available.

The present disclosure provides a granular conductive carbon black and a preparation method thereof, which can improve the hydrophilic property of a raw material of the conductive carbon black, and control the particle size of the prepared granular conductive carbon black.

An embodiment of the present disclosure is realized as follows:

In a first aspect, an example of the present disclosure provides a method for preparing a granular conductive carbon black, which includes:

making a raw material of the conductive carbon black undergo, in sequence, moistening with water of a temperature of 80° C. or higher, performing wet granulation and drying.

In the above technical solution, as the raw material of the conductive carbon black per se is insoluble in water, the inventors found through tests and analyses that the raw material of the conductive carbon black, after undergoing moistening with water of a temperature of 80° C. or higher and then granulation in sequence, has relatively good dispersibility, which effect is similar to the effect caused by adding a dispersant.

The inventors further found that compared with room-temperature deionized water, the water of a temperature of 80° C. or higher has a smaller surface tension, and can enter microporous structures of carbon black more easily, then it is not easy to form a water film on the surface of the raw material of the conductive carbon black, which facilitates the water of a temperature of 80° C. or higher in entering the microporous structures of the raw material of the conductive carbon black, to achieve a good moistening effect, and further the granular conductive acetylene carbon black with uniform particle size distribution is prepared through wet granulation and drying.

Moreover, in the present disclosure, the hydrophilic property of the raw material of the conductive carbon black is improved only through moistening with water of a temperature of 80° C. or higher, while no dispersant is added, therefore, the prepared granular conductive carbon black is relatively pure.

In combination with the first aspect, in a first possible example of the first aspect of the present disclosure, the water of a temperature of 80° C. or higher is liquid water, and the moistening includes uniformly mixing the raw material of the conductive carbon black with a preset amount of liquid water of a temperature of 80° C. or higher;

Optionally, a mass ratio of the raw material of the conductive carbon black to the liquid water to be mixed is 2.5:1~3.5:1.

Optionally, the liquid water is of a temperature of 90° C. or higher.

Optionally, the liquid water is of a temperature of 95° C. or higher.

In the above example, the water of a temperature of 80° C. or higher is liquid water having a smaller surface tension, which can easily enter the microporous structures of carbon black, and then it is not easy to form a water film on the surface of the raw material of the conductive carbon black, which facilitates the water in entering the microporous structures of the raw material of the conductive carbon black, to achieve a good moistening effect.

In combination with the first aspect, in a second possible example of the first aspect of the present disclosure, the water of a temperature of 80° C. or higher is steam, and the moistening includes introducing a preset amount of steam to the raw material of the conductive carbon black.

Optionally, a mass ratio of the raw material of the conductive carbon black to the introduced steam is 2.5:1~3.5:1.

In the above example, the steam has a smaller surface tension than liquid water, which can easily enter the microporous structures of carbon black, then it is not easy to form a water film on the surface of the raw material of the conductive carbon black, which facilitates the steam in entering the microporous structures of the raw material of the conductive carbon black, to achieve a good moistening effect.

In combination with the first aspect, in a third possible example of the first aspect of the present disclosure, the water of a temperature of 80° C. or higher comprises liquid water and steam mixed in any proportion, and the moistening includes uniformly mixing the raw material of the conductive carbon black with a preset amount of liquid water of a temperature of 80° C. or higher and introducing a preset amount of the steam to the raw material of the conductive carbon black.

Optionally, a mass ratio of the raw material of the conductive carbon black to a mass sum of the mixed liquid water and the introduced steam is 2.5:1~3.5:1.

In the above example, the steam further can be used in conjunction with the liquid water to achieve the purpose of moistening the raw material of the conductive carbon black.

In combination with the first aspect, in a fourth possible example of the first aspect of the present disclosure, the above steam has a pressure of 0.5~0.7 MPa.

In the above example, the above pressure of the steam facilitates the steam in entering the microporous structures of the raw material of the conductive carbon black, so as to improve the infiltration effect and efficiency on the raw material of the conductive carbon black.

Meanwhile, in a high-temperature state, the raw material of the conductive carbon black may be oxidized in the presence of oxygen, therefore, an oxygen-containing gas cannot be introduced.

In combination with the first aspect, in a fifth possible example of the first aspect of the present disclosure, the above wet granulation includes:

uniformly mixing a solvent with the raw material of the conductive carbon black having been moistened by water of a temperature of 80° C. or higher.

The solvent includes water.

Optionally, a mass ratio of the raw material of the conductive carbon black to the solvent is 2.5:6.5~3.5:5.5.

In the above example, the purpose of granulation is achieved by infiltrating the raw material of the conductive carbon black in water of a temperature of 80° C. or higher and directly mixing the raw material of the conductive carbon black with water, so that on one hand, the consumption of water having a temperature of 80° C. or higher is saved, and energy and cost are saved, and on the other hand, a relatively good infiltration effect can be achieved through cooperation of the two.

In combination with the first aspect, in a sixth possible example of the first aspect of the present disclosure, the above method for preparing a granular conductive carbon black further includes screening a granular conductive carbon black having a target particle size, wherein the screening is carried out after or simultaneously with the drying.

In the above example, the screening is used to screen out the granular conductive carbon black outside a predetermined particle size range, so that the prepared granular conductive carbon black is within a predetermined particle size distribution range.

In a second aspect, an example of the present disclosure provides a granular conductive carbon black, which is prepared according to the above method for preparing a granular conductive carbon black.

In the above technical solution, the granular conductive carbon black has excellent performance and can be widely applied to the fields of novel lead-acid batteries, primary and secondary lithium batteries, ultrahigh voltage cables and so on.

In combination with the second aspect, in a first possible example of the second aspect of the present disclosure, the particle size distribution of the above granular conductive carbon black is 0.6~1 mm, and secondary particle size distribution of the granular conductive carbon black is 4~8 μm.

In the above example, when the particle size distribution of the granular conductive carbon black is 0.6~1 mm, production requirements can be met.

The raw material of the conductive carbon black per se is insoluble in water. The inventors found through analyses that the raw material of the conductive carbon black has many microporous structures, then if the raw material of the conductive carbon black is directly mixed with deionized water for granulation, the deionized water will form a water film on the surface of the raw material of the conductive carbon black under the effect of surface tension, so that the raw material of the conductive carbon black is prevented from being further bound with the deionized water, as a result, the moistening effect of the raw material of the conductive carbon black becomes poor, and the poor moistening effect leads to relatively poor granulation effect, and uneven granulation.

Especially for the raw material of the conductive carbon black with an oil adsorption value of 220 ml/L or higher and iodine adsorption capacity of 60~100 mg/g of the carbon black, this raw material of the conductive carbon black not only can be applied to common rubber and resin, but also can be applied to the fields of novel lead-acid batteries, primary and secondary lithium batteries, ultrahigh voltage cables and so on, while it has quite poor water solubility.

A granular conductive carbon black and a preparation method thereof in the examples of the present disclosure are described specifically below:

The present disclosure provides a method for preparing a granular conductive carbon black, which includes:

making a raw material of the conductive carbon black undergo moistening with water of a temperature of 80° C. or higher, performing wet granulation and drying in sequence.

The water of a temperature of 80° C. or higher includes liquid water and/or steam.

In an embodiment of the present disclosure, the water of a temperature of 80° C. or higher may be merely high-temperature liquid water or steam, or the high-temperature liquid water and steam are used in combination.

When the water of a temperature of 80° C. or higher is liquid water, the moistening includes uniformly mixing the raw material of the conductive carbon black with a preset amount of liquid water of a temperature of 80° C. or higher;

when the water of a temperature of 80° C. or higher is steam, the moistening includes introducing a preset amount of steam to the raw material of the conductive carbon black;

when the water of a temperature of 80° C. or higher comprises liquid water and steam mixed in any proportion, the moistening includes uniformly mixing the raw material of the conductive carbon black with a preset amount of liquid water of a temperature of 80° C. or higher and introducing a preset amount of the steam to the raw material of the conductive carbon black.

It should be noted that the liquid water also can be atomized and then directly sprayed onto the surface of the raw material of the conductive carbon black.

When the high-temperature liquid water and the steam are used in combination, the two can be cooperatively used in any proportion, including but not limited to cooperative use of 90% by mass of the high-temperature liquid water and 10% by mass of the steam, cooperative use of 80% by mass of the high-temperature liquid water and 20% by mass of the steam, cooperative use of 50% by mass of the high-temperature liquid water and 50% by mass of the steam, cooperative use of 20% by mass of the high-temperature liquid water and 80% by mass of the steam, and cooperative use of 10% by mass of the high-temperature liquid water and 90% by mass of the steam.

The high-temperature liquid water may be of a temperature of 80° C. or 90° C. or 95° C.

Optionally, the high-temperature liquid water is of a temperature of 90° C. or higher.

Optionally, the liquid water is of a temperature of 95° C. or higher.

Compared with room-temperature deionized water, the water of a temperature of 80° C. or higher has a smaller surface tension, which can enter the microporous structures of carbon black more easily, then it is not easy to form a water film on the surface of the raw material of the conductive carbon black, which facilitates the water of a temperature of 80° C. or higher in entering the microporous structures of the raw material of the conductive carbon black, to achieve a good moistening effect, and further the granular conductive acetylene carbon black having uniform particle size distribution is prepared through wet granulation and drying.

When the water of a temperature of 80° C. or higher includes steam, the pressure of the steam is 0.5~0.7 MPa, and a suitable pressure is favorable for the steam to be capable of entering the microporous structures of the raw material of the conductive carbon black relatively quickly.

In an embodiment of the present disclosure, the pressure of the steam may be 0.5 MPa, and also may be 0.6 MPa or 0.7 MPa.

It should be noted that the above pressure is absolute pressure, and generally, the pressure of one atmospheric pressure is 0.1 MPa, that is, the relative pressure relative to the atmospheric pressure is 0.4~0.6 MPa.

Optionally, in order to meet some performance requirements, the raw material of the conductive carbon black chosen in the present disclosure has an oil adsorption value of 220 ml/L or higher, and an iodine adsorption capacity of 60~100 mg/g of the carbon black.

The wet granulation includes conveying the raw material of the conductive carbon black, having been moistened by water of a temperature of 80° C. or higher, into a wet granulator for wet granulation, wherein a solvent needs to be added if necessary.

It should be noted that the mass fraction of water in the granular conductive carbon black having undergone wet granulation is 65~75%. If the mass fraction of water in the raw material of the conductive carbon black having treated by the water of a temperature of 80° C. or higher is less than 65~75%, a solvent needs to be added during wet granulation.

In an embodiment of the present disclosure, the mass fraction of water in the granular conductive carbon black having undergone the wet granulation may be 65% or 70% or 75%.

The solvent includes any one or more of water, a carboxymethyl cellulose aqueous solution, a honey aqueous solution and lignin, and when the solvent is any one or more of the carboxymethyl cellulose aqueous solution, the honey aqueous solution and the lignin, the mass fraction of the solvent in the raw material of the conductive carbon black needs to be re-adjusted.

Typically, the solvent is water.

When the above raw material of the conductive carbon black is moistened by water of a temperature of 80° C. or higher, the mass ratio of the raw material of the conductive carbon black to the water of a temperature of 80° C. or higher is 2.5:1~3.5:1.

When budget is sufficient, it is feasible to directly moisten the raw material of the conductive carbon black with water of a temperature of 80° C. or higher so that the mass fraction of water in the raw material of the conductive carbon black is 65~75%, and no other solvents are added during the wet granulation.

When an economical and practical solution is selected, the raw material of the conductive carbon black is first moistened with water of a temperature of 80° C. or higher to enable the mass fraction of water in the raw material of the conductive carbon black to be 8-12%, and then room-temperature deionized water is added during the wet granulation to enable the mass fraction of water in the raw material of the granular conductive carbon black before drying to be 65~75%.

Evidently, the raw material of the conductive carbon black also can be moistened with water of a temperature of 80° C. or higher to enable the mass fraction of water in the raw material of the conductive carbon black to be greater than 8~12%, and then residual solvent is added during the wet granulation.

That is, when the above raw material of the conductive carbon black is moistened by water of a temperature of 80° C. or higher, the mass ratio of the raw material of the conductive carbon black to the water of a temperature of 80° C. or higher is 2.5:1~3.5:1, and the mass ratio of the raw material of the conductive carbon black to the deionized water is 2.5:6.5~3.5:5.5 during the wet granulation.

This method reduces the energy consumption of heating a part of water to the temperature of 80° C. or higher, and is a choice with higher economic benefit. In this method, a part of water of a temperature of 80° C. or higher has been able to infiltrate the raw material of the conductive carbon black, so that the raw material of the conductive carbon black can be bound with the other part of deionized water in the subsequent wet granulation process to obtain the raw material of the granular conductive carbon black.

The drying includes a first time of drying for 20~60 min, a second time of drying for 20~60 min and a third time of drying for 20~60 min which are carried out in sequence.

In the above, the temperature of the first time of drying is 120~180° C., the temperature of the second time of drying is 220~280° C., and the temperature of the third time of drying is 120~180° C. The relatively low temperature in the first time of drying can enable the solvent in the granular conductive carbon black to volatilize slowly, raising the temperature to a relatively high temperature in the second time of drying facilitates the granular conductive carbon black in forming a more stable structure in the volatilization process of the solvent, and final desolventizing treatment is completed for the granular conductive carbon black when the temperature is reduced in the third time of drying.

In the embodiment of the present disclosure, the temperature in the first time of drying may be 120° C. or 150° C. or 180° C., and also may be 120~150° C. or 150~180° C. or 120~180° C.; the temperature in the second time of drying may be 220° C. or 250° C. or 280° C., and also may be 220~250° C. or 250~280° C. or 220~280° C.; and the temperature in the third time of drying may be 120° C., 150° C. or 180° C., and also may be 120~150° C., 150~180° C. or 120~180° C.

Optionally, the granular conductive carbon black also can be screened during the drying process or after the drying.

The screening can be used to screen out the granular conductive carbon black outside a predetermined particle size range, so that the prepared granular conductive carbon black is within a predetermined particle size distribution range.

The present disclosure further provides a granular conductive carbon black, which is prepared according to the above method for preparing a granular conductive carbon black.

The granular conductive carbon black, with the particle size distribution of 0.6~1 mm and the secondary particle size distribution of 4~8 μm, not only can be applied to common rubber and resin, but also can be applied to fields of novel lead-acid batteries, primary and secondary lithium batteries, ultrahigh voltage cables and so on.

It should be noted that the above secondary particle size is secondary particle size of D50, that is, the secondary particle size of 50% of the particles in the granular conductive carbon black.

The granular conductive carbon black and the preparation method thereof in the present disclosure are further described in detail below in combination with examples.

Example 1

An example of the present disclosure provides a granular conductive carbon black and a preparation method thereof, including following steps:

1. Moistening

Selecting a raw material of the conductive carbon black with an oil adsorption value of 220 ml/L or higher and iodine adsorption capacity of 60~100 mg/g of the carbon black, introducing the raw material of the conductive carbon black and 0.6 Mpa steam at a mass ratio of 3:1 into an infiltration device for infiltration, and meanwhile introducing nitrogen to balance a pressure inside the infiltration device.

2. Wet Granulation

Conveying the raw material of the conductive carbon black having been moistened by the steam into a wet granulator, and adding deionized water for wet granulation, wherein a mass ratio of the added deionized water to the raw material of the conductive carbon black is 6:3, so that a mass fraction of water in the prepared granular conductive carbon black is 70%.

3. Drying

Making the granular conductive carbon black undergo a first time of drying for 30 min, a second time of drying for 30 min and a third time of drying for 30 min, respectively, to obtain the granular conductive carbon black, wherein temperature in the first time of drying is 150° C., temperature in the second time of drying is 250° C., and temperature in the third time of drying is 150° C.

Example 2

An example of the present disclosure provides a granular conductive carbon black and a preparation method thereof, including following steps:

1. Moistening

Selecting a raw material of the conductive carbon black with an oil adsorption value of 220 ml/L or higher and iodine adsorption capacity of 60~100 mg/g of the carbon black, introducing the raw material of the conductive carbon black and 90° C. high-temperature water at a mass ratio of 3:1 into an infiltration device for infiltration, and meanwhile introducing nitrogen to balance a pressure inside the infiltration device.

2. Wet Granulation

Conveying the raw material of the conductive carbon black having been moistened by the high-temperature liquid water of a temperature of 90° C. into a wet granulator, and adding deionized water for wet granulation, wherein a mass ratio of the added deionized water to the raw material of the conductive carbon black is 6:3, so that a mass fraction of water in the prepared granular conductive carbon black is 70%.

3. Drying

Making the granular conductive carbon black undergo a first time of drying for 30 min, a second time of drying for 30 min and a third time of drying for 30 min, respectively, to obtain the granular conductive carbon black, wherein temperature in the first time of drying is 150° C., temperature in the second time of drying is 250° C., and temperature in the third time of drying is 150° C.

Example 3

An example of the present disclosure provides a granular conductive carbon black and a preparation method thereof, including following steps:

1. Moistening

Selecting a raw material of the conductive carbon black with an oil adsorption value of 220 ml/L or higher and iodine adsorption capacity of 60~100 mg/g of the carbon black, introducing the raw material of the conductive carbon black and mixed water of 50% by mass of 0.7 Mpa steam and 50% by mass of 80° C. high-temperature water at a mass ratio of 2.5:1 into an infiltration device for infiltration, and meanwhile introducing nitrogen to balance a pressure inside the infiltration device.

2. Wet Granulation

Conveying the raw material of the conductive carbon black having been moistened by the water of a temperature of 80° C. or higher into a wet granulator, and adding deionized water for wet granulation, wherein a mass ratio of the added deionized water to the raw material of the conductive carbon black is 6.5:2.5, so that a mass fraction of water in the prepared granular conductive carbon black is 75%.

3. Drying

Making the granular conductive carbon black undergo a first time of drying for 20 min, a second time of drying for 60 min and a third time of drying for 20 min, respectively, to obtain the granular conductive carbon black, wherein temperature in the first time of drying is 180° C., temperature in the second time of drying is 280° C., and temperature in the third time of drying is 180° C.

Example 4

An example of the present disclosure provides a granular conductive carbon black and a preparation method thereof, including following steps:

1. Moistening

Selecting a raw material of the conductive carbon black with an oil adsorption value of 220 ml/L or higher and iodine adsorption capacity of 60~100 mg/g of the carbon black, introducing the raw material of the conductive carbon black and mixed water of 50% by mass of 0.5 Mpa steam and 20% by mass of 95° C. high-temperature water at a mass ratio of 3.5:1 into an infiltration device for infiltration, and meanwhile introducing nitrogen to balance a pressure inside the infiltration device.

2. Wet Granulation

Conveying the raw material of the conductive carbon black having been moistened by the water of a temperature of 80° C. or higher into a wet granulator, and adding deionized water for wet granulation, wherein a mass ratio of the added deionized water to the raw material of the conductive carbon black is 5.5:3.5, so that a mass fraction of water in the prepared granular conductive carbon black is 65%.

3. Drying

Making the granular conductive carbon black undergo a first time of drying for 60 min, a second time of drying for 20 min and a third time of drying for 60 min, respectively, to obtain the granular conductive carbon black, wherein temperature in the first time of drying is 120° C., temperature in the second time of drying is 220° C., and temperature in the third time of drying is 120° C.

Example 5

An example of the present disclosure provides a granular conductive carbon black and a preparation method thereof, including following steps:

1. Moistening

Selecting a raw material of the conductive carbon black with an oil adsorption value of 220 ml/L or higher and iodine adsorption capacity of 60~100 mg/g of the carbon black, introducing the raw material of the conductive carbon black and 0.6 Mpa steam at a mass ratio of 3:7 into an infiltration device for infiltration, and meanwhile introducing nitrogen to balance a pressure inside the infiltration device.

2. Wet Granulation

Conveying the raw material of the conductive carbon black having been moistened by the steam into a wet granulator for wet granulation, so that a mass fraction of water in the prepared granular conductive carbon black is 70%.

3. Drying

Making the granular conductive carbon black undergo a first time of drying, a second time of drying and a third time of drying, respectively, to obtain the granular conductive carbon black, wherein temperature in the first time of drying is 150° C., temperature in the second time of drying is 250° C., and temperature in the third time of drying is 150° C.

Example 6

An example of the present disclosure provides a granular conductive carbon black and a preparation method thereof, including following steps:

1. Moistening

Selecting a raw material of the conductive carbon black with an oil adsorption value of 220 ml/L or higher and iodine adsorption capacity of 60~100 mg/g of the carbon black, introducing the raw material of the conductive carbon black and 0.1 Mpa steam at a mass ratio of 3:1 into an infiltration device for infiltration, and meanwhile introducing nitrogen to balance a pressure inside the infiltration device.

2. Wet Granulation

Conveying the raw material of the conductive carbon black having been moistened by the steam into a wet granulator, and adding deionized water for wet granulation, wherein a mass ratio of the added deionized water to the raw material of the conductive carbon black is 6:3, so that a mass fraction of water in the prepared granular conductive carbon black is 70%.

3. Drying

Making the granular conductive carbon black undergo a first time of drying for 30 min, a second time of drying for 30 min and a third time of drying for 30 min, respectively, to obtain the granular conductive carbon black, wherein temperature in the first time of drying is 150° C., temperature in the second time of drying is 250° C., and temperature in the third time of drying is 150° C.

Example 7

An example of the present disclosure provides a granular conductive carbon black and a preparation method thereof, including following steps:

1. Moistening

Selecting a raw material of the conductive carbon black with an oil adsorption value of 220 ml/L or higher and iodine adsorption capacity of 60~100 mg/g of the carbon black, introducing the raw material of the conductive carbon black and 0.6 Mpa steam at a mass ratio of 3:1 into an infiltration device for infiltration, and meanwhile introducing nitrogen to balance a pressure inside the infiltration device.

2. Wet Granulation

Conveying the raw material of the conductive carbon black having been moistened by the steam into a wet granulator, and adding deionized water for wet granulation, wherein a mass ratio of the added deionized water to the raw material of the conductive carbon black is 6:3, so that a mass fraction of water in the prepared granular conductive carbon black is 70%.

3. Drying

Making the granular conductive carbon black undergo drying for 90 min at a temperature of 200° C.

Comparative Example 1

A comparative example of the present disclosure provides a granular conductive carbon black and a preparation method thereof, including following steps:

1. Wet Granulation

Selecting a raw material of the conductive carbon black with an oil adsorption value of 220 ml/L or higher and iodine adsorption capacity of 60~100 mg/g of the carbon black, conveying the raw material of the conductive carbon black into a wet granulator, and adding deionized water for wet granulation, wherein a mass ratio of the added deionized water to the raw material of the conductive carbon black is 7:3, so that a mass fraction of water in the prepared granular conductive carbon black is 70%.

2. Drying

Making the granular conductive carbon black undergo a first time of drying for 30 min, a second time of drying for 30 min and a third time of drying for 30 min, respectively, to obtain the granular conductive carbon black, wherein temperature in the first time of drying is 150° C., temperature in the second time of drying is 250° C., and temperature in the third time of drying is 150° C.

Comparative Example 2

A comparative example of the present disclosure provides a granular conductive carbon black and a preparation method thereof, including following steps:
1. Wet Granulation
Selecting a raw material of the conductive carbon black with an oil adsorption value of 220 ml/L or higher and iodine adsorption capacity of 60~100 mg/g of the carbon black, conveying the raw material of the conductive carbon black into a wet granulator, and adding deionized water and polyvinylpyrrolidone dispersant for wet granulation, wherein a mass ratio of the added deionized water to the raw material of the conductive carbon black is 5:5, so that a mass fraction of water in the prepared granular conductive carbon black is 70%.
2. Drying
Making the granular conductive carbon black undergo a first time of drying for 30 min, a second time of drying for 30 min and a third time of drying for 30 min, respectively, to obtain the granular conductive carbon black, wherein temperature in the first time of drying is 150° C., temperature in the second time of drying is 250° C., and temperature in the third time of drying is 150° C.

Comparative Example 3

A comparative example of the present disclosure provides a granular conductive carbon black and a preparation method thereof, including following steps:
1. Moistening
Selecting a raw material of the conductive carbon black with an oil adsorption value of 220 ml/L or higher and iodine adsorption capacity of 60~100 mg/g of the carbon black, introducing the raw material of the conductive carbon black and 50° C. water at a mass ratio of 3:1 into an infiltration device for infiltration, and meanwhile introducing nitrogen to balance a pressure inside the infiltration device.
2. Wet Granulation
Conveying the raw material of the conductive carbon black having been moistened by 50° C. water into a wet granulator, and adding deionized water for wet granulation, wherein a mass ratio of the added deionized water to the raw material of the conductive carbon black is 6:3, so that a mass fraction of water in the prepared granular conductive carbon black is 70%.
3. Drying
Making the granular conductive carbon black undergo a first time of drying for 30 min, a second time of drying for 30 min and a third time of drying for 30 min, respectively, to obtain the granular conductive carbon black, wherein temperature in the first time of drying is 150° C., temperature in the second time of drying is 250° C., and temperature in the third time of drying is 150° C.

Comparative Example 4

A comparative example of the present disclosure provides a granular conductive carbon black and a preparation method thereof, including following steps:
1. Moistening
Selecting a raw material of the conductive carbon black with an oil adsorption value of 220 ml/L or higher and iodine adsorption capacity of 60~100 mg/g of the carbon black, introducing the raw material of the conductive carbon black and 0.6 MPa steam at a mass ratio of 1:1 into an infiltration device for infiltration, and meanwhile introducing nitrogen to balance a pressure inside the infiltration device.
2. Wet Granulation
Conveying the raw material of the conductive carbon black having been moistened by the steam into a wet granulator, and adding deionized water for wet granulation, wherein a mass ratio of the added deionized water to the raw material of the conductive carbon black is 8:1, so that a mass fraction of water in the prepared granular conductive carbon black is 90%.
3. Drying
Making the granular conductive carbon black undergo a first time of drying for 30 min, a second time of drying for 30 min and a third time of drying for 30 min, respectively, to obtain the granular conductive carbon black, wherein temperature in the first time of drying is 150° C., temperature in the second time of drying is 250° C., and temperature in the third time of drying is 150° C.

Comparative Example 5

A comparative example of the present disclosure provides a granular conductive carbon black and a preparation method thereof, including following steps:
1. Moistening
Selecting a raw material of the conductive carbon black with an oil adsorption value of 220 ml/L or higher and iodine adsorption capacity of 60~100 mg/g of the carbon black, introducing the raw material of the conductive carbon black and 0.6 MPa steam at a mass ratio of 1:5 into an infiltration device for infiltration, and meanwhile introducing nitrogen to balance a pressure inside the infiltration device.
2. Wet Granulation
Conveying the raw material of the conductive carbon black having been moistened by the steam into a wet granulator, and adding deionized water for wet granulation, wherein a mass ratio of the added deionized water to the raw material of the conductive carbon black is 4:5, so that a mass fraction of water in the prepared granular conductive carbon black is 50%.
3. Drying
Making the granular conductive carbon black undergo a first time of drying for 30 min, a second time of drying for 30 min and a third time of drying for 30 min, respectively, to obtain the granular conductive carbon black, wherein temperature in the first time of drying is 150° C., temperature in the second time of drying is 250° C., and temperature in the third time of drying is 150° C.

Test Example 1

Each dried granular conductive carbon black prepared in Examples 1~7 and Comparative Examples 1~5 was subjected to the following tests:
measuring the oil adsorption value of the carbon black with a method of GB/T14853.6; measuring the iodine adsorption values of acetylene carbon black with GB/T3780.1; measuring particle strength of acetylene carbon black with the method of GB/T14853.6; measuring the average particle size and maximum particle size with a method of Rubber Compounding Ingredients—Pelletized Carbon Black—Part 5: Determination of Pellet Size Distribution of GB/T14853.5-2013; measuring the secondary particle size (D50) of acetylene carbon black with a method of GB/T19077.1; measuring a coarse powder value (325 meshes) in the acetylene carbon black with a method of GB/T3781.5; and measuring an iron content with a spectrophotometer method. Data are as shown in Table 1:

TABLE 1

Properties of Granular Conductive Carbon Blacks

| | DBP Oil Adsorption Value (ml/L) | Iodine Adsorption Value (mg/g) | Particle Strength (g per particle) | Average Particle Size (mm) | Maximum Particle Size (mm) | Secondary Particle Size (μm) |
|---|---|---|---|---|---|---|
| Example 1 | 232 | 98 | 6.2 | 0.60-0.98 | 1.21 | 6.21 |
| Example 2 | 234 | 99 | 5.9 | 0.65-1 | 1.25 | 6.11 |
| Example 3 | 231 | 98 | 6.1 | 0.62-1.2 | 1.33 | 6.24 |
| Example 4 | 232 | 97 | 4.7 | 0.52-0.91 | 1.08 | 6.32 |
| Example 5 | 231 | 98 | 6.1 | 0.62-1 | 1.23 | 6.23 |
| Example 6 | 232 | 98 | 4.8 | 0.4-0.95 | 1.35 | 6.24 |
| Example 7 | 235 | 99 | 5.2 | 0.51-1.34 | 1.41 | 6.33 |
| Comparative Example 1 | 233 | 97 | 4.1 | 0.2-0.7 | 0.8 | 6.15 |
| Comparative Example 2 | 232 | 98 | 6.8 | 0.5-0.91 | 1.1 | 6.27 |
| Comparative Example 3 | 234 | 97 | 4.2 | 0.3-0.71 | 0.77 | 6.22 |
| Comparative Example 4 | 232 | 97 | The length-diameter ratio was too large, which cannot be made into granules | | | |
| Comparative Example 5 | 234 | 98 | The particles were loosen and became powders with a particle size below 0.3, and powders predominated | | | |

It can be seen from Example 1, Example 2, Example 3, Example 4 and Example 5 that the hydrophilic property of the raw material of the conductive carbon black can be improved by infiltrating the raw material of the conductive carbon black with steam and/or hot water, and the particle size distribution of most of the prepared granular conductive carbon blacks is controlled to be 0.6~1 mm.

It can be seen from comparison between Example 1 and Example 6 that when the pressure of the steam is relatively low, the steam cannot completely enter the raw material of the conductive carbon black, so that the particle size distribution of the prepared granular conductive carbon black is relatively poor, the particle size distribution is 0.4~0.95 mm, and the maximum particle size is 1.35 mm.

It can be seen from comparison between Example 1 and Example 7 that the particle size distribution of the granular conductive carbon black that is not dried stepwise is relatively poor, with the particle size distribution of 0.51~1.34 mm and the maximum particle size of 1.41 mm.

It can be seen from comparison between Example 1 and Comparative Example 1 that the average particle size of the prepared granular conductive carbon black is 0.2~0.7 mm when the deionized water is directly mixed with the raw material of the conductive carbon black, and the deionized water cannot infiltrate the raw material of the conductive carbon black, so that the deionized water and the raw material of the conductive carbon black are mixed relatively poorly.

It can be seen from comparison between Example 1 and Comparative Example 2 that the dispersibility of the dispersant is relatively good, but the dispersant will introduce new impurities, then the prepared granular conductive carbon black is not pure.

It can be seen from comparison between Example 2 and Comparative Example 3 that the infiltration effect of 50° C. water is relatively poor, so that the deionized water and the raw material of the conductive carbon black are mixed relatively poorly, and the average particle size of the prepared granular conductive carbon black is 0.3~0.71 mm.

It can be seen from comparison between Example 1 and Comparative Examples 4 and 5 that when the amount of deionized water added to the raw material of the conductive carbon black is excessive, the particles will collapse and cannot be granulated; and when too little deionized water is added to the raw material of the conductive carbon black, the particles will be loosened and cracked, and granulated poorly.

To sum up, according to the granular conductive carbon black and the preparation method thereof provided in the examples of the present disclosure, in the method for preparing the granular conductive carbon black, the raw material of the conductive carbon black is infiltrated by the water of a temperature of 80° C. or higher, so that the hydrophilic property of the raw material of the conductive carbon black is enhanced, the water of a temperature of 80° C. or higher enters the microporous structures of the raw material of the conductive carbon black, then a good moistening effect is achieved, and further the granular conductive acetylene carbon black with uniform particle size distribution is prepared through wet granulation and drying. The prepared granular conductive carbon black, with the particle size distribution of 0.6~1 mm, and the secondary particle size distribution of 4~8 μm, not only can be applied to common rubber and resin, but also can be applied to the fields of novel lead-acid batteries, primary and secondary lithium batteries, ultrahigh voltage cables and so on.

The above-mentioned are merely for specific embodiments of the present disclosure and not used to limit the present disclosure, and for one skilled in the art, various variations and changes may be made to the present disclosure. Any modifications, equivalent substitutions, improvements and so on made within the spirit and principle of the present disclosure should be covered within the scope of protection of the present disclosure.

What is claimed is:

1. A method for preparing a granular carbon black, wherein the method for preparing a granular carbon black comprises:
   making a raw material of the carbon black undergo, in sequence, moistening with deionized water of a temperature of 80° C. or higher, wherein the deionized water of a temperature of 80° C. or higher is liquid water, and the moistening comprises uniformly mixing the raw material of the carbon black with a preset amount of the liquid water of a temperature of 80° C. or higher, wherein a mass ratio of the raw material of the carbon black to the liquid water to be mixed is selected from a range of 2.5:1 to 3.5:1; or wherein the deionized water of a temperature of 80° C. or higher is steam, and the moistening comprises introducing a preset amount of the steam to the raw material of the carbon black, wherein a mass ratio of the raw material of the carbon black to introduced steam is selected from a range of 2.5:1 to 3.5:1; or wherein the deionized water of a temperature of 80° C. or higher comprises liquid water and steam mixed in any proportion, and the moistening comprises uniformly mixing the raw material of the carbon black with a preset amount of the liquid water of a temperature of 80° C. or higher and introducing a preset amount of the steam to the raw material of the carbon black, wherein a mass ratio of the raw material of the carbon black to a mass sum of mixed liquid water and introduced steam is selected from a range of 2.5:1 to 3.5:1;

performing wet granulation,
wherein the wet granulation comprises uniformly mixing the deionized water with the raw material of the carbon black having been moistened by the deionized water of a temperature of 80° C. or higher and/or steam; and drying the moistened carbon black.

2. The method for preparing a granular carbon black according to claim 1, wherein the liquid water is of a temperature of 90° C. or higher.

3. The method for preparing a granular carbon black according to claim 1, wherein the liquid water is of a temperature of 95° C. or higher.

4. The method for preparing a granular carbon black according to claim 1, wherein the steam has a pressure selected from a range of 0.5 to 0.7 MPa.

5. The method for preparing a granular carbon black according to claim 1, wherein a mass ratio of the raw material of the carbon black to the deionized water is selected from the range of 2.5:6.5 to 3.5:5.5 during wet granulation.

6. The method for preparing a granular carbon black according to claim 1, wherein the method for preparing a granular carbon black further comprises screening a granular carbon black having a target particle size, wherein the screening is carried out after the drying or at the same time with the drying.

* * * * *